United States Patent
Okubo et al.

(10) Patent No.: US 12,406,807 B2
(45) Date of Patent: Sep. 2, 2025

(54) MULTILAYER CERAMIC CAPACITOR

(71) Applicant: Murata Manufacturing Co., Ltd., Nagaokakyo (JP)

(72) Inventors: Natsuko Okubo, Nagaokakyo (JP); Akito Mori, Nagaokakyo (JP); Kazuhisa Uchida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 242 days.

(21) Appl. No.: 18/109,309

(22) Filed: Feb. 14, 2023

(65) Prior Publication Data

US 2023/0317374 A1   Oct. 5, 2023

(30) Foreign Application Priority Data

Feb. 16, 2022   (JP) ................. 2022-021772

(51) Int. Cl.
| | |
|---|---|
| H01G 4/12 | (2006.01) |
| H01G 4/008 | (2006.01) |
| H01G 4/012 | (2006.01) |
| H01G 4/30 | (2006.01) |

(52) U.S. Cl.
CPC .......... *H01G 4/1227* (2013.01); *H01G 4/008* (2013.01); *H01G 4/012* (2013.01); *H01G 4/30* (2013.01); *H01G 4/1236* (2013.01)

(58) Field of Classification Search
CPC .......... H01G 4/005; H01G 4/012; H01G 4/30
See application file for complete search history.

(56) References Cited

U.S. PATENT DOCUMENTS

| | | |
|---|---|---|
| 2012/0073129 A1 | 3/2012 | Abe et al. |
| 2014/0211369 A1* | 7/2014 | Sasabayashi ........ H01G 4/0085 361/301.4 |
| 2018/0061575 A1 | 3/2018 | Mizuno |
| 2019/0348222 A1 | 11/2019 | Kato |
| 2020/0185152 A1* | 6/2020 | Uchida ................. H01G 4/012 |
| 2021/0202177 A1 | 7/2021 | Kurosu et al. |

(Continued)

FOREIGN PATENT DOCUMENTS

| | | |
|---|---|---|
| JP | 2012094819 A | 5/2012 |
| JP | 2018133419 A | 8/2018 |

(Continued)

OTHER PUBLICATIONS

Office Action in JP2022-021772, mailed Mar. 19, 2024, 3 pages.

*Primary Examiner* — Nathan Milakovich

(74) *Attorney, Agent, or Firm* — Keating & Bennett, LLP

(57) ABSTRACT

A multilayer ceramic capacitor includes a multilayer body including dielectric layers and internal electrode layers, and external electrodes. The multilayer body includes side margin portions made of a dielectric. In the internal electrode layers, a width of an extension electrode portion is smaller than a width of a counter electrode portion. The side margin portions each include Ba and Ti as a main component and Mg as a sub component. The Mg content is about 0.2 mol % or more and about 2.0 mol % or less with respect to 100 mol of Ti. The internal electrode layers each include Ni as a main component, and an end portion of the counter electrode portion includes Mg as a sub component. The Mg content is about 0.13 mol % or more and about 0.39 mol % or less with respect to 100 mol of Ni.

20 Claims, 8 Drawing Sheets

(56) References Cited

U.S. PATENT DOCUMENTS

2021/0233712 A1* 7/2021 Lee .................... H01G 4/1227
2021/0335541 A1* 10/2021 Ikeda .................... H01G 2/065

FOREIGN PATENT DOCUMENTS

| JP | 2019161235 A | 9/2019 |
| JP | 2019-197790 A | 11/2019 |
| JP | 2021108364 A | 7/2021 |

* cited by examiner

MULTILAYER CERAMIC CAPACITOR

CROSS REFERENCE TO RELATED APPLICATIONS

This application claims the benefit of priority to Japanese Patent Application No. 2022-021772 filed on Feb. 16, 2022. The entire contents of this application are hereby incorporated herein by reference.

BACKGROUND OF THE INVENTION

1. Field of the Invention

The present invention relates to a multilayer ceramic capacitor.

2. Description of the Related Art

Multilayer ceramic capacitors have been known which include a multilayer body in which a plurality of dielectric layers made of a ceramic material and a plurality of internal electrode layers are laminated, and external electrodes provided at end surfaces of the multilayer body. Furthermore, multilayer ceramic capacitors have been also known which include side margin portions provided on the lateral surfaces of a multilayer body to sandwich a plurality of dielectric layers and a plurality of internal electrode layers, and including a dielectric made of a ceramic material (for example, refer to Japanese Unexamined Patent Application Publication No. 2019-197790).

SUMMARY OF THE INVENTION

In such multilayer ceramic capacitors, it is conceivable to reduce the thickness of the side margin portion and increase the area of the internal electrode layer in order to reduce the size and increase the capacitance. However, if the thickness of the side margin portion is reduced, the resistance to moisture, i.e., moisture resistance, that penetrates into the side margin portion from the lateral surface of the multilayer body to reach the internal electrode layer may be reduced, and as a result, the reliability may decline.

Furthermore, in such a multilayer ceramic capacitor, it is conceivable that the resistance to moisture, i.e., moisture resistance, which penetrates from between the lateral surface of the multilayer body and the external electrode to reach the internal electrode layer of the end surface of the multilayer body decreases, and as a result, the reliability declines.

Preferred embodiments of the present invention provide multilayer ceramic capacitors that each improve moisture resistance reliability.

A multilayer ceramic capacitor according to a preferred embodiment of the present invention includes a multilayer body including a plurality of dielectric layers made of a ceramic material and a plurality of internal electrode layers laminated therein, two main surfaces opposed to each other in a lamination direction, two lateral surfaces opposed to each other in a width direction intersecting the lamination direction, and two end surfaces opposed to each other in a length direction intersecting the lamination direction and the width direction, and two external electrodes provided on each of the two end surfaces of the multilayer body. The multilayer body includes two side margin portions provided to sandwich the plurality of dielectric layers and the plurality of internal electrode layers in the width direction. The two side margin portions each include a dielectric made of a ceramic material. Each of the plurality of internal electrode layers includes, in the length direction, counter electrode portions opposed to each other between adjacent internal electrode layers in the lamination direction and an extension electrode portion extending from the counter electrode portion toward one of the two end surfaces, end portions in the width direction of the counter electrode portions of the plurality of internal electrode layers are aligned to be positioned in a range of about 5 μm in the width direction, and a width in the width direction of the extension electrode portion is smaller than a width in the width direction of the counter electrode portion. Each of the two side margin portions includes Ba and Ti as main components, and Mg as a sub component, and Mg content in each of the two side margin portions is about 0.2 mol % or more and about 2.0 mol % or less with respect to 100 mol of Ti. Each of the plurality of internal electrode layers includes Ni as a main component, an end portion in the width direction of the counter electrode portion of each of the plurality of internal electrode layers includes Mg as a sub component, and Mg content at the end portion in the width direction of the counter electrode portion of each of the plurality of internal electrode layers is about 0.13 mol % or more and about 0.39 mol % or less with respect to 100 mol of Ni.

According to preferred embodiments of the present invention, it is possible improve moisture resistance reliability in multilayer ceramic capacitors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
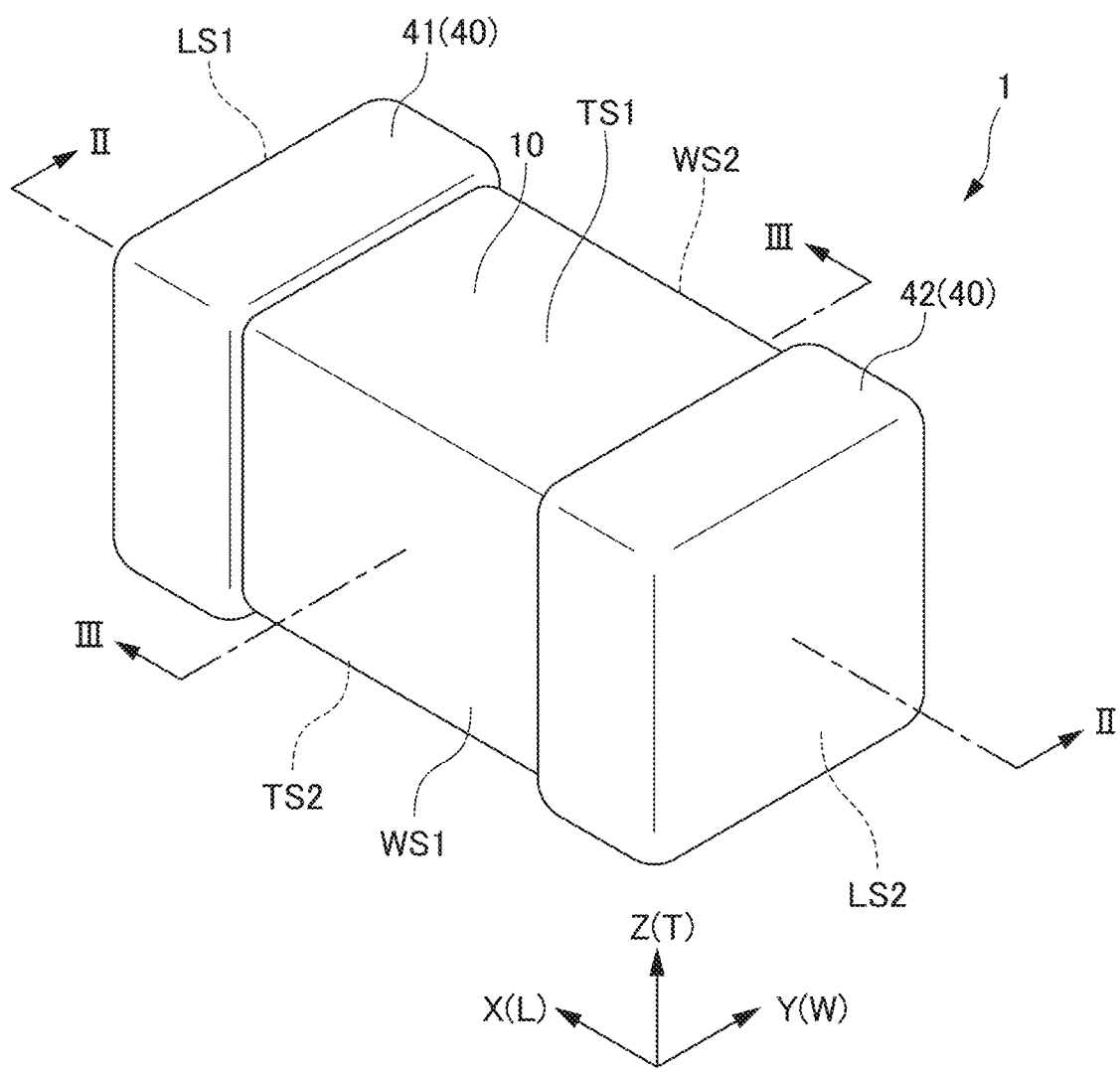
FIG. 1 is a perspective view showing a multilayer ceramic capacitor according to a preferred embodiment of the present invention.

Preferred embodiments of the present invention and modifications thereof will now be described with reference to the accompanying drawings. In the drawings, the same or corresponding portions are denoted by the same reference numerals.

Multilayer Ceramic Capacitor

Figure 2:
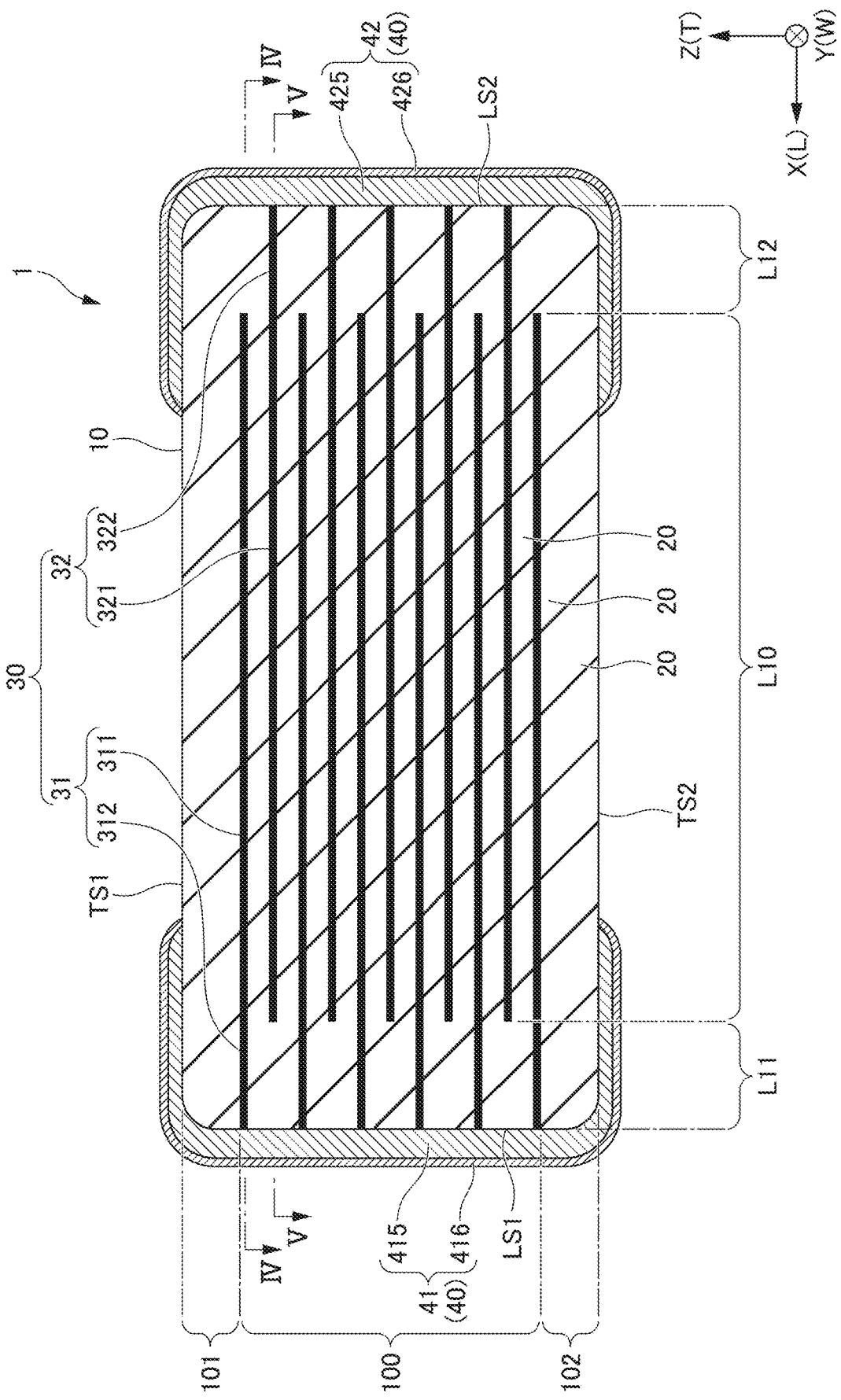
FIG. 2 is a cross-sectional view (LT cross-section) taken along the line II-II of the multilayer ceramic capacitor shown in FIG. 1.
Figure 3:
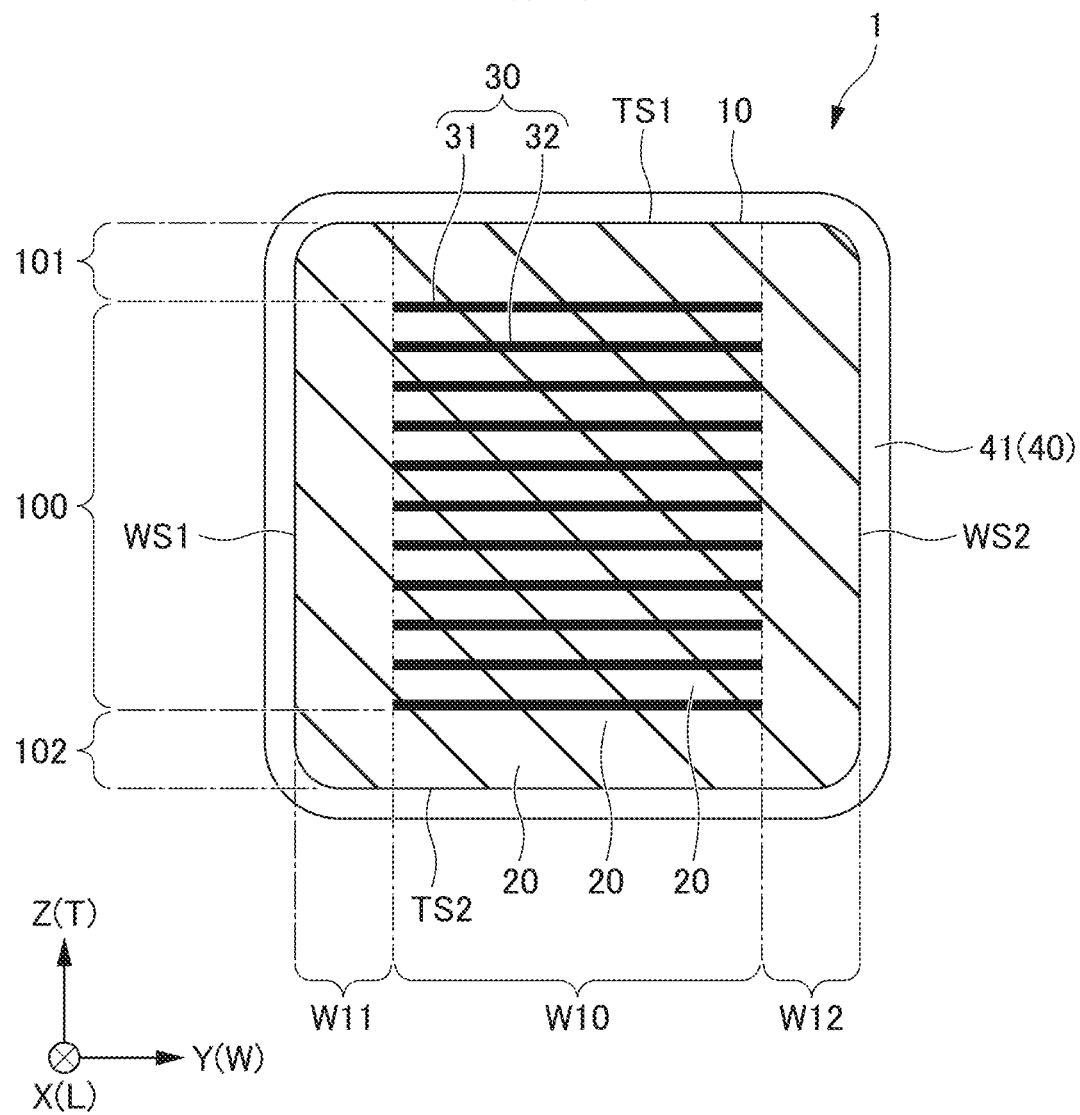
FIG. 3 is a cross-sectional view (WT cross-section) taken along the line III-III of the multilayer ceramic capacitor shown in FIG. 1.
Figure 4:
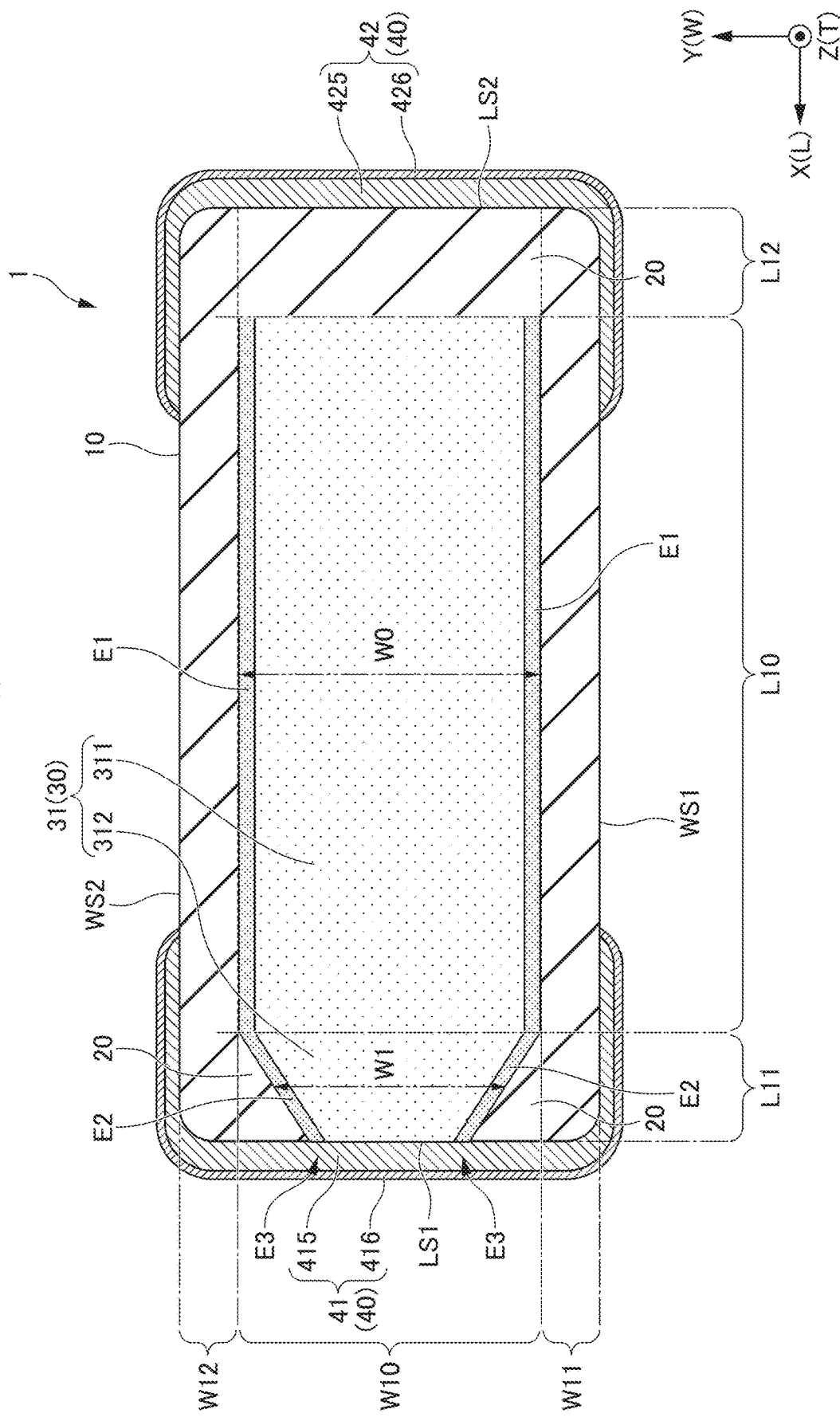
FIG. 4 is a cross-sectional view (LW cross-sectional view) taken along the line IV-IV of the multilayer ceramic capacitor shown in FIG. 2.
Figure 5:
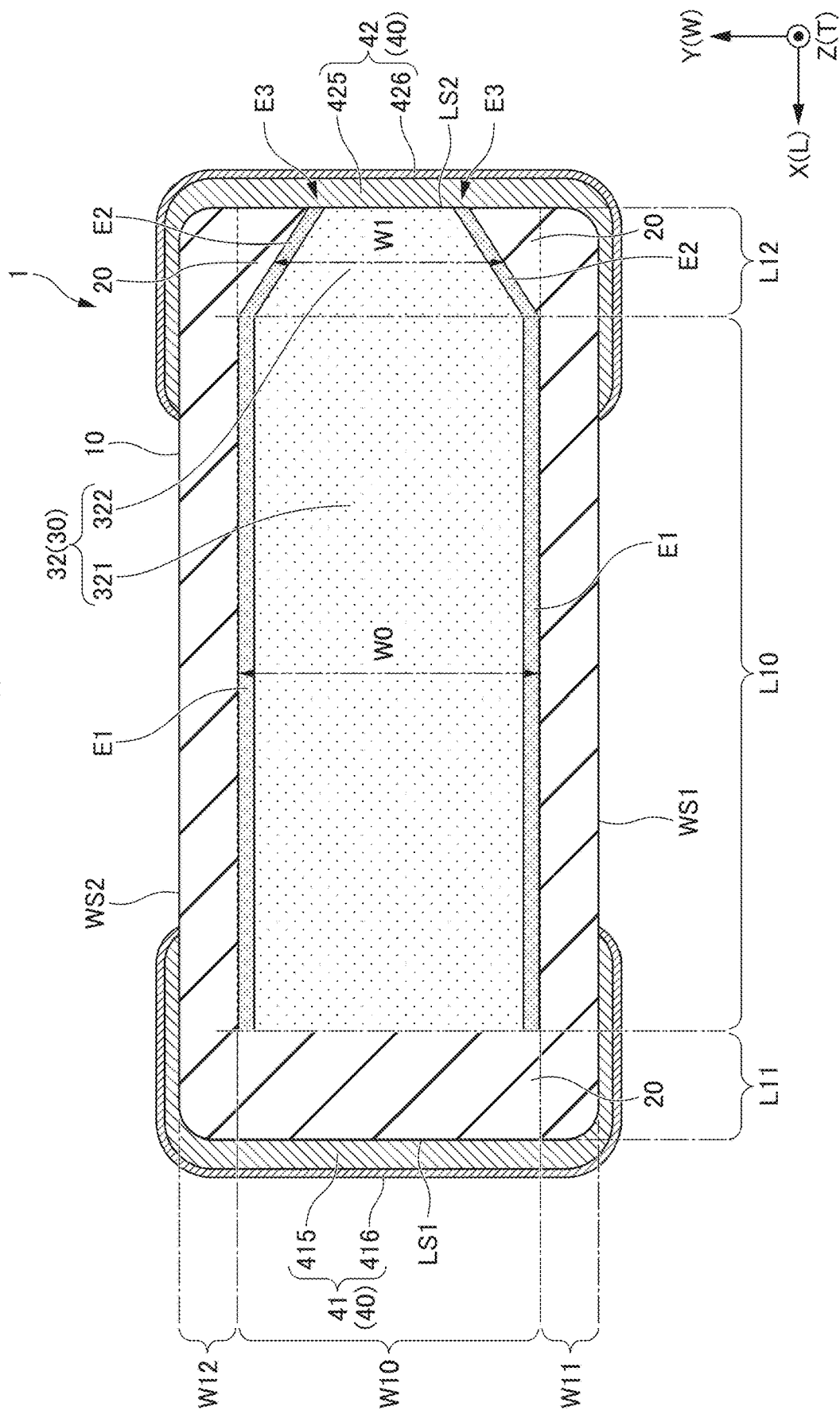
FIG. 5 is a cross-sectional view (LW section) taken along the line V-V of the multilayer ceramic capacitor shown in FIG. 2.

FIG. 1 is a perspective view showing a multilayer ceramic capacitor according to a preferred embodiment of the present invention. FIG. 2 is a cross-sectional view taken along a line II-II of the multilayer ceramic capacitor shown in FIG. 1. FIG. 3 is a cross-sectional view taken along a line III-III of the multilayer ceramic capacitor shown in FIG. 1. FIG. 4 is a cross-sectional view taken along a line IV-IV of the multilayer ceramic capacitor shown in FIG. 2. FIG. 5 is a cross-sectional view taken along a line V-V of the multilayer ceramic capacitor shown in FIG. 2. The multilayer ceramic capacitor 1 shown in FIGS. 1 to 5 includes a multilayer body 10 and external electrodes 40. The external electrodes 40 include a first external electrode 41 and a second external electrode 42.

FIGS. 1 to 5 each show an XYZ orthogonal coordinate system. The X direction refers to the length direction L of the multilayer ceramic capacitor 1 and the multilayer body 10. The Y direction refers to the width direction W of the multilayer ceramic capacitor 1 and the multilayer body 10. The Z direction refers to the lamination (stacking) direction T of the multilayer ceramic capacitor 1 and the multilayer body 10. Thus, the cross section shown in FIG. 2 is also referred to as an LT cross section, the cross section shown in FIG. 3 is also referred to as a WT cross section, and the cross section shown in FIGS. 4 and 5 is also referred to as an LW cross section.

The length direction L, the width direction W, and the lamination direction T are not necessarily orthogonal to each other, and may intersect each other.

The multilayer body 10 has a rectangular or substantially rectangular parallelepiped shape, and includes a first main surface TS1 and a second main surface TS2 which are opposed to each other in the lamination direction T, a first lateral surface WS1 and a second lateral surface WS2 which are opposed to each other in the width direction W, and a first end surface LS1 and a second end surface LS2 which are opposed to each other in the length direction L.

The corner portions and ridge portions of the multilayer body 10 are preferably rounded. The corner portions are each a portion where the three surfaces of the multilayer body 10 intersect, and the ridge portions are each a portion where the two surfaces of the multilayer body 10 intersect.

As shown in FIGS. 2 and 3, the multilayer body 10 includes a plurality of dielectric layers 20 and a plurality of internal electrode layers 30 laminated in the lamination direction T. The multilayer body 10 includes an inner layer portion 100, and a first outer layer portion 101 and a second outer layer portion 102 that sandwich the inner layer portion 100 in the lamination direction T.

The inner layer portion 100 includes a portion of the plurality of dielectric layers 20 and a plurality of internal electrode layers 30. In the inner layer portion 100, a plurality of internal electrode layers 30 are opposed to each other with the dielectric layer 20 interposed therebetween. The inner layer portion 100 is a portion that generates capacitance and substantially functions as a capacitor.

The first outer layer portion 101 is provided adjacent to the first main surface TS1 of the multilayer body 10, and the second outer layer portion 102 is provided adjacent to the second main surface TS2 of the multilayer body 10. More specifically, the first outer layer portion 101 is provided between the internal electrode layer 30 closest to the first main surface TS1 of the plurality of internal electrode layers 30 and the first main surface TS1, and the second outer layer portion 102 is provided between the internal electrode layer 30 closest to the second main surface TS2 of the plurality of internal electrode layers 30 and the second main surface TS2. The first outer layer portion 101 and the second outer layer portion 102 do not include the internal electrode layer 30, but include portions of the plurality of dielectric layers 20 other than the portion for the inner layer portion 100. The first outer layer portion 101 and the second outer layer portion 102 are portions, each functioning as a protective layer of the inner layer portion 100.

Furthermore, as shown in FIG. 3, the multilayer body 10 has a first lateral surface-side outer layer portion W11 (hereinafter also referred to as a first side margin portion) and a second lateral surface-side outer layer portion W12 (hereinafter also referred to as a second side margin portion) provided to sandwich the inner layer portion 100, the first outer layer portion 101, and the second outer layer portion 102, that is, the plurality of dielectric layers 20 and the plurality of internal electrode layers 30, in the width direction W. A portion sandwiched between the first side margin portion W11 and the second side margin portion W12 and including the plurality of dielectric layers 20 and the plurality of internal electrode layers 30 is also referred to as an electrode counter portion W10.

The first side margin portion W11 is provided adjacent to the first lateral surface WS1 of the multilayer body 10, and the second side margin portion W12 is provided adjacent to the second lateral surface WS2 of the multilayer body 10. More specifically, the first side margin portion W11 is positioned between the end of the internal electrode layer 30 adjacent to the first lateral surface WS1 and the first lateral surface WS1, and the second side margin portion W12 is positioned between the end of the internal electrode layer 30 adjacent to the second lateral surface WS2 and the second lateral surface WS2. The first side margin portion W11 and the second side margin portion W12 are each made of a dielectric material. The first side margin portion W11 and the second side margin portion W12 are portions each functioning as a protective layer of the internal electrode layer 30. The first side margin portion W11 and the second side margin portion W12 are each referred to as a side gap or a W gap.

As a material of the dielectric layer 20, for example, a dielectric ceramic including $BaTiO_3$, $CaTiO_3$, $SrTiO_3$, $CaZrO_3$, or the like as a main component can be used. As a material of the dielectric layer 20, at least one of Mg, Si, Mn, rare earth elements, Al, Ni, V, and the like may be added as a subcomponent. Thus, the dielectric layer 20 includes Ba and Ti as main components, and at least one of Mg, Si, Mn, rare earth elements, Al, Ni, V, and the like as subcomponents. Examples of the rare earth elements include at least one element selected from the group including La, Ce, Pr, Nd, Sm, Eu, Gd, Tb, Dy, Ho, Er, Tm, Yb, Lu and Y, and among them, Dy is preferred. The dielectric layer 20 includes a plurality of dielectric grains. In the present specification, the main component is defined as a component having the highest weight %.

The thickness of the dielectric layer 20 is not particularly limited, but is preferably, for example, about 0.40 μm or more and about 0.50 μm or less, and more preferably about 0.40 μm or more and about 0.45 μm or less. The number of dielectric layers 20 is not particularly limited, but is preferably, for example, 100 or more and 2000 or less. The number of the dielectric layers 20 is a total number of the number of the dielectric layers of the inner layer portion and the number of the dielectric layers of the outer layer portion.

Similarly, a dielectric ceramic including $BaTiO_3$, $CaTiO_3$, $SrTiO_3$, $CaZrO_3$, or the like as a main component can be used as a material of the dielectric of the first side margin portion W11 and the second side margin portion W12. Furthermore, as a material of the dielectric of the first side margin portion W11 and the second side margin portion W12, at least one selected from Mg, Si, Mn, a rare earth element, Al, Ni, V, and the like may be added as a subcomponent. Thus, the dielectric of the first side margin portion W11 and the second side margin portion W12 include Ba and Ti as main components, and at least one selected from Mg, Si, Mn, rare earth elements, Al, Ni, V, and the like as subcomponents. Examples of the rare earth element include at least one element selected from the group including La, Ce, Pr, Nd, Sm, Eu, Gd, Tb, Dy, Ho, Er, Tm, Yb, Lu and Y, and among them, Dy is preferred. Furthermore, the dielectric layer 20 includes a plurality of dielectric grains.

The thicknesses of the first side margin portion W11 and the second side margin portion W12 are not particularly limited, but are preferably, for example, about 13 μm or more and about 25 μm or less, and more preferably about 13 μm or more and about 18 μm or less. The dielectric in each of the first side margin portion W11 and the second side margin portion W12 is not particularly limited, but may include a single-layer structure or a multi-layer structure of two or more layers.

The plurality of internal electrode layers 30 includes a plurality of first internal electrode layers 31 and a plurality of second internal electrode layers 32. The plurality of first internal electrode layers 31 and the plurality of second internal electrode layers 32 are alternately provided in the lamination direction T of the multilayer body 10.

The first internal electrode layers 31 each include a counter electrode portion 311 and an extension electrode portion 312, and the second internal electrode layers 32 each include a counter electrode portion 321 and an extension electrode portion 322.

The counter electrode portion 311 and the counter electrode portion 321 are opposed to each other with the dielectric layer 20 interposed therebetween in the lamination direction T of the multilayer body 10. The shapes of the counter electrode portion 311 and the counter electrode portion 321 are not particularly limited, and may be rectangular or substantially rectangular, for example. End portions of the counter electrode portion 311 and the counter electrode portion 321 in the width direction W are aligned so as to be positioned in a range of about 5 μm in the width direction, for example. The counter electrode portion 311 and the counter electrode portion 321 are portions which define and function as capacitors to generate capacitances.

The extension electrode portion 312 extends from the counter electrode portion 311 toward the first end surface LS1 of the multilayer body 10, and is exposed at the first end surface LS1. The extension electrode portion 322 extends from the counter electrode portion 321 toward the second end surface LS2 of the multilayer body 10, and is exposed at the second end surface LS2. The extension electrode portion 312 and the extension electrode portion 322 will be described in detail later.

Thus, the first internal electrode layer 31 is connected to the first external electrode 41, and a gap exists between the first internal electrode layer 31 and the second end surface LS2 of the multilayer body 10, i.e., the second external electrode 42. Furthermore, the second internal electrode layer 32 is connected to the second external electrode 42, and a gap exists between the second internal electrode layer 32 and the first end surface LS1 of the multilayer body 10, i.e., the first external electrode 41.

The first internal electrode layer 31 and the second internal electrode layer 32 include metal Ni as a main component. Furthermore, the first internal electrode layer 31 and the second internal electrode layer 32 may include, for example, at least one selected from metals such as Cu, Ag, Pd, and Au or alloys including at least one of these metals such as Ag—Pd alloy as a main component, or may include a component other than the main component. Furthermore, the first internal electrode layer 31 and the second internal electrode layer 32 may include dielectric particles having the same composition as the ceramic included in the dielectric layer 20 as components other than the main component. In this specification, the metal of the main component is defined as a metal component having the highest weight %.

The thicknesses of the first internal electrode layer 31 and the second internal electrode layer 32 are not particularly limited, but are preferably, for example, about 0.30 μm or more and about 0.40 μm or less, and more preferably about 0.30 μm or more and about 0.35 μm or less. The number of the first internal electrode layer 31 and the second internal electrode layer 32 is not particularly limited, but is preferably, for example, 10 or more and 1000 or less.

As shown in FIG. 2, the multilayer body 10 includes an electrode counter portion L10 in which the first internal electrode layer 31 and the second internal electrode layer 32 of the internal electrode layer 30 are opposed to each other in the length direction L, a first end margin portion L11, and a second end margin portion L12. The first end margin portion L11 is positioned between the electrode counter portion L10 and the first end surface LS1, and the second end margin portion L12 is positioned between the electrode counter portion L10 and the second end surface LS2. More specifically, the first end margin portion L11 is positioned between the end of the second internal electrode layer 32 adjacent to the first end surface LS1 and the first end surface LS1, and the second end margin portion L12 is positioned between the end of the first internal electrode layer 31 adjacent to the second end surface LS2 and the second end surface LS2. The first end margin portion L11 does not include the second internal electrode layer 32 and includes the first internal electrode layer 31 and the dielectric layer 20, and the second end margin portion L12 does not include the first internal electrode layer 31 and includes the second internal electrode layer 32 and the dielectric layer 20. The first end margin portion L11 functions as an extension electrode portion to the first end surface LS1 of the first internal electrode layer 31, and the second end margin portion L12 functions as an extension electrode portion to the second end surface LS2 of the second internal electrode layer 32. The first end margin portion L11 and the second end margin portion L12 are each also referred to as an end gap or an L gap.

The counter electrode portion 311 of the first internal electrode layer 31 and the counter electrode portion 321 of the second internal electrode layer 32 described above are positioned in the electrode counter portion L10. Furthermore, the extension electrode portion 312 of the first internal electrode layer 31 described above is positioned in the first end margin portion L11, and the extension electrode portion 322 of the second internal electrode layer 32 described above is positioned in the second end margin portion L12.

The dimensions of the multilayer body 10 described above are not particularly limited but, for example, the length in the length direction L is preferably about 0.6 mm or more and about 1.6 mm or less, the width in the width direction W is preferably about 0.3 mm or more and about 0.8 mm or less, and the thickness in the lamination direction T is preferably about 0.3 mm or more and about 0.8 mm or less. Furthermore, the dimensions of the multilayer ceramic capacitor 1 including the external electrodes 40, which will be described later, are not particularly limited but, for example, the length in the length direction L is preferably about 0.6 mm or more and about 1.6 mm or less, the width in the width direction W is preferably about 0.3 mm or more and about 0.8 mm or less, and the thickness in the lamination direction T is preferably about 0.3 mm or more and about 0.8 mm or less.

Examples of a method of measuring the thicknesses of the dielectric layer 20 and the internal electrode layer 30, for example, include a method of observing an LT cross section in the vicinity of the center in the width direction of the multilayer body exposed by polishing with a scanning electron microscope. Furthermore, each value may be an average value of measurement values at a plurality of positions in the length direction, or may be an average value of measurement values at a plurality of positions in the lamination direction.

Similarly, examples of a method of measuring the thickness of the multilayer body 10 or the thickness of the multilayer ceramic capacitor 1, for example, include a method of observing an LT cross section in the vicinity of the center in the width direction of the multilayer body exposed by polishing, or a WT cross section in the vicinity of the center in the length direction of the multilayer body or the multilayer ceramic capacitor exposed by polishing with a scanning electron microscope. Furthermore, each value may be an average value of measurement values at a plurality of positions in the length direction or the width direction. Similarly, examples of a method of measuring the length of the multilayer body 10 or the length of the multilayer ceramic capacitor 1, for example, include a method of observing an LT cross section in the vicinity of the center in the width direction of the multilayer body or the multilayer ceramic capacitor exposed by polishing with a scanning electron microscope. Furthermore, each value may be an average value of measurement values at a plurality of locations in the lamination direction. Similarly, examples of a method of measuring the width of the multilayer body 10 or the width of the multilayer ceramic capacitor 1, for example, include a method of observing a WT cross section in the vicinity of the center in the length direction of the multilayer body or the multilayer ceramic capacitor exposed by polishing with a scanning electron microscope. Furthermore, each value may be an average value of measurement values at a plurality of locations in the lamination direction.

The external electrodes 40 includes a first external electrode 41 and a second external electrode 42.

The first external electrode 41 is provided on the first end surface LS1 of the multilayer body 10 and is connected to the first internal electrode layers 31. The first external electrode 41 may extend from the first end surface LS1 to a portion of the first main surface TS1 and a portion of the second main surface TS2. Furthermore, the first external electrode 41 may extend from the first end surface LS1 to a portion of the first lateral surface WS1 and a portion of the second lateral surface WS2.

The second external electrode 42 is provided on the second end surface LS2 of the multilayer body 10 and is connected to the second internal electrode layers 32. The second external electrode 42 may extend from the second end surface LS2 to a portion of the first main surface TS1 and a portion of the second main surface TS2. The second external electrode 42 may extend from the second end surface LS2 to a portion of the first lateral surface WS1 and a portion of the second lateral surface WS2.

The first external electrode 41 includes a first base electrode layer 415 and a first plated layer 416, and the second external electrode 42 includes a second base electrode layer 425 and a second plated layer 426. The first external electrode 41 may include only the first plated layer 416, and the second external electrode 42 may include only the second plated layer 426.

The first base electrode layer 415 and the second base electrode layer 425 may be fired layers including metal and glass. Examples of the glass include glass components including at least one selected from B, Si, Ba, Mg, Al, Li, and the like. As a specific example, borosilicate glass can be used. The metal includes Cu as a main component. The metal may include at least one selected from a metal such as Ni, Ag, Pd, or Au or an alloy such as Ag—Pd alloy as a main component, or may include a component other than the main component.

The fired layer is a layer obtained by applying an electrically conductive paste including a metal and glass to a multilayer body by a dipping method and firing the multilayer body. The fired layer may be fired after firing the internal electrode layer, or may be fired simultaneously with the internal electrode layer. The fired layer may include a plurality of layers.

Alternatively, the first base electrode layer 415 and the second base electrode layer 425 may be resin layers, each including electrically conductive particles and a thermosetting resin. The resin layer may be provided on the fired layer described above, or may be provided directly on the multilayer body without providing the fired layer.

The resin layer is a layer obtained by applying an electrically conductive paste including electrically conductive particles and a thermosetting resin to a multilayer body by a coating method and firing the multilayer body. The resin layer may be fired after firing the internal electrode layer, or may be fired simultaneously with the internal electrode layer. The resin layer may include a plurality of layers.

The thickness per layer of each of the first base electrode layer 415 and the second base electrode layer 425 serving as a fired layer or a resin layer is not particularly limited, and may be about 1 μm or more and about 10 μm or less.

Alternatively, the first base electrode layer 415 and the second base electrode layer 425 each may be formed by a thin film formation method such as a sputtering method or a vapor deposition method, and each may be a thin film layer having a thickness of about 1 μm or less in which metal particles are deposited.

The first plated layer 416 covers at least a portion of the first base electrode layer 415, and the second plated layer 426 covers at least a portion of the second base electrode layer 425. Examples of the first plated layer 416 and the second plated layer 426 include at least one selected from a metal such as Cu, Ni, Ag, Pd, or Au, or an alloy such as an Ag—Pd alloy.

The first plated layer 416 and the second plated layer 426 each may include a plurality of layers. They preferably include a two-layer structure of Ni plating and Sn plating. The Ni plated layer can prevent the base electrode layer from being eroded by the solder when the ceramic electronic component is mounted, and the Sn plated layer can improve the wettability of solder when the ceramic electronic component is mounted, allowing for easy mounting.

The thickness per layer of each of the first plated layer 416 and the second plated layer 426 is not particularly limited, and may be about 1 μm or more and about 10 μm or less, for example.

Side Margin Portion

Next, the first side margin portion W11 and the second side margin portion W12 will be further described.

Each of the first side margin portion W11 and the second side margin portion W12 includes Mg as a subcomponent. The content of Mg in each of the first side margin portion W11 and the second side margin portion W12 is about 0.2 mol % or more and about 2.0 mol % or less with respect to 100 mol of Ti, for example.

Each of the first side margin portion W11 and the second side margin portion W12 may include Si as a subcomponent. The content of Si in each of the first side margin portion W11 and the second side margin portion W12 is preferably about 0.2 mol % or more and about 2.0 mol % or less with respect to 100 mol of Ti, for example.

Each of the first side margin portion W11 and the second side margin portion W12 may include a rare earth element Dy as a subcomponent. The content of the rare earth element Dy in each of the first side margin portion W11 and the second side margin portion W12 is preferably about 0.8 mol % or more and about 2.0 mol % or less with respect to 100 mol of Ti, for example.

Examples of a method of measuring the content of Mg, Si, or rare earth element Dy in the first side margin portion W11 and the second side margin portion W12 include a method of observing a WT cross section in the vicinity of the center in the length direction of the multilayer body exposed by polishing. Examples of the measuring instrument include wavelength dispersive X-ray analysis (WDX) or energy dispersive X-ray analysis (EDX), and scanning electron microscope (SEM) or transmission electron microscope (TEM). Each value may be an average value of measurement values at a plurality of locations in the lamination direction.

Internal Electrode Layer

Next, the internal electrode layer 30, that is, the first internal electrode layer 31 and the second internal electrode layer 32, will be further described.

As shown in FIG. 4, in the first internal electrode layer 31, the width of the extension electrode portion 312 in the width direction W is smaller than the width of the counter electrode portion 311 in the width direction W. For example, the width W1 of the extension electrode portion 312 in the width direction W in the vicinity of the center in the length direction is smaller than the width W0 of the counter electrode portion 311 in the width direction W in the vicinity of the center in the length direction of the multilayer body 10. Furthermore, as shown in FIG. 5, in the second internal electrode layer 32, the width of the extension electrode portion 322 in the width direction W is smaller than the width of the counter electrode portion 321 in the width direction W. For example, the width W1 of the extension electrode portion 322 in the width direction W in the vicinity of the center in the length direction is smaller than the width W0 of the counter electrode portion 321 in the width direction W in the vicinity of the center in the length direction of the multilayer body 10.

Examples of a method of measuring the widths W0 and W1 of the internal electrode layer 30 include a method of observing the LW cross section of the internal electrode layer in the vicinity of the center in the lamination direction of the multilayer body exposed by polishing. For example, in a case where the multilayer ceramic capacitor 1 is 0603 size (L=0.6 mm, W=0.3 mm, T=0.3 mm), the length in the length direction L of the extension electrode portions 312 and 322 is 25 μm, in a case where the multilayer ceramic capacitor 1 is 1005 size (L=1.0 mm, W=0.5 mm, T=0.5 mm), the length in the length direction L of the extension electrode portions 312 and 322 is about 25 μm, and in a case where the multilayer ceramic capacitor 1 is 1608 size (L=1.6 mm, W=0.8 mm, T=0.8 mm), the length in the length direction L of the extension electrode portions 312 and 322 is about 40 μm or more and 50 μm or less, for example. The size and dimensions of the multilayer ceramic capacitor 1 include the multilayer body 10 and the external electrode 40.

The shape of the extension electrode portion 312 is not particularly limited but, for example, as shown in FIG. 4, the extension electrode portion 312 may have a trapezoidal or substantially trapezoidal shape linearly narrowing from both corners of the end of the counter electrode portion 311 adjacent to the first end surface LS1 toward the first end surface LS1. Similarly, the shape of the extension electrode portion 322 is not particularly limited but, for example, as shown in FIG. 5, the extension electrode portion 322 may have a trapezoidal shape or substantially trapezoidal shape linearly narrowing from both corners of the end of the counter electrode portion 321 adjacent to the second end surface LS2 toward the second end surface LS2.

Figure 6:
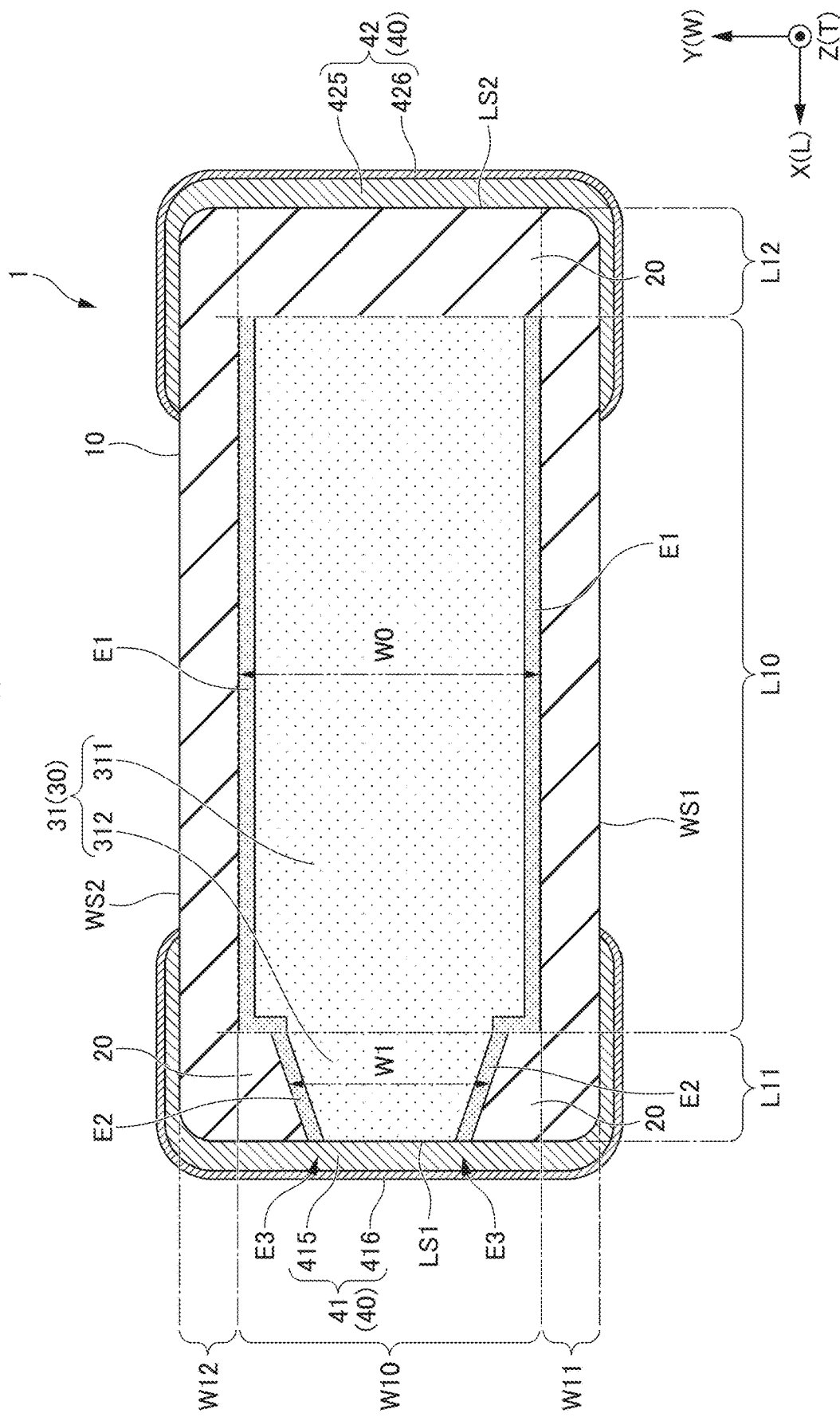
FIG. 6 is a cross-sectional view (LW cross-sectional view) of a multilayer ceramic capacitor according to a first modified example of the present preferred embodiment of the present invention, which corresponds to FIG. 4.

Alternatively, as shown in FIG. 6, the shape of the extension electrode portion 312 may have a trapezoidal or substantially trapezoidal shape that linearly narrows from a portion narrower than each of both corners of the end of the counter electrode portion 311 adjacent to the first end surface LS1 toward the first end surface LS1. Similarly, the shape of the extension electrode portion 322 may have a trapezoidal or substantially trapezoidal shape (not shown) that linearly narrows from a portion narrower than each of both corners of the end of the counter electrode portion 321 adjacent to the second end surface LS2 toward the second end surface LS2.

Figure 7:
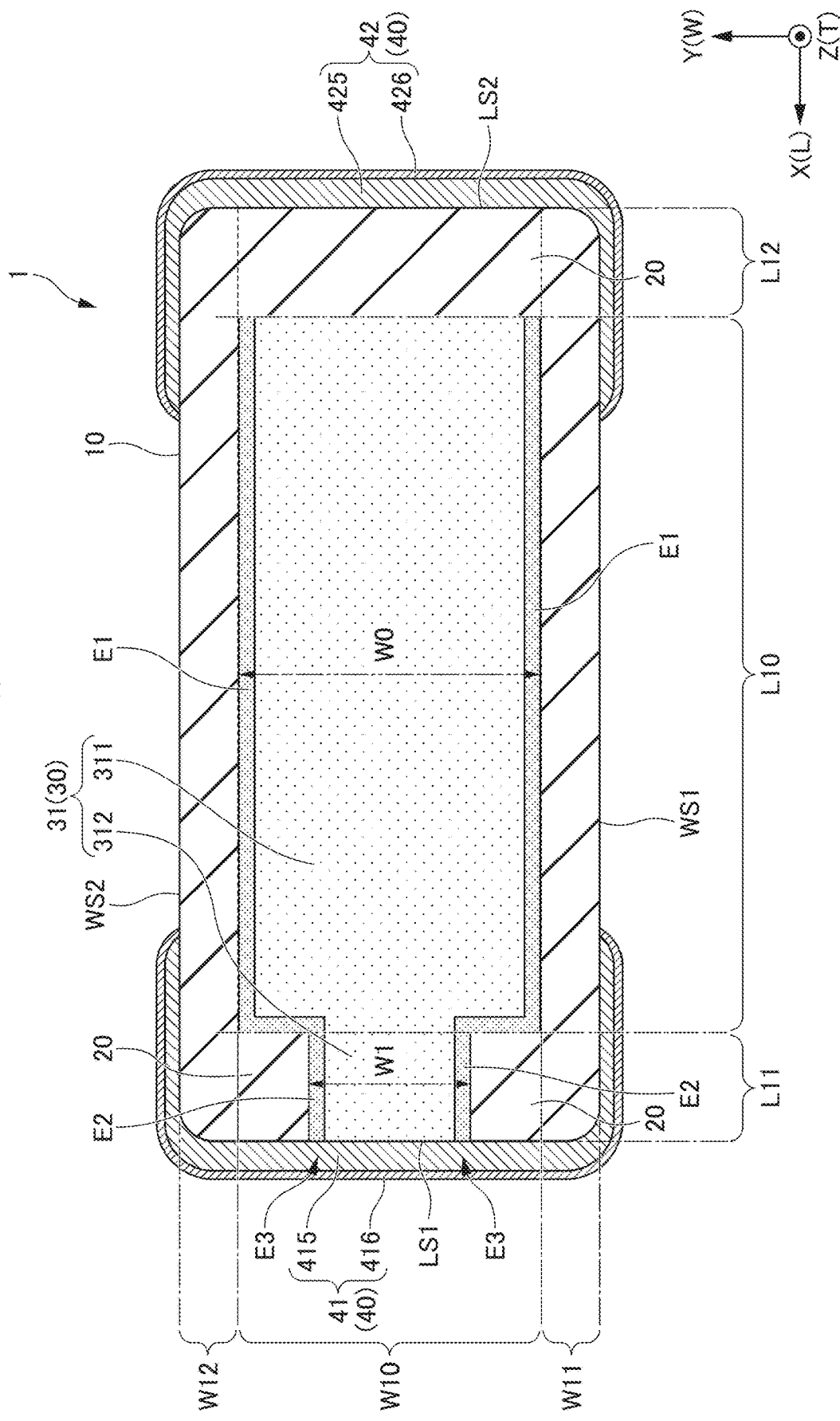
FIG. 7 is a cross-sectional view (LW cross-sectional view) of a multilayer ceramic capacitor according to a second modified example of the present preferred embodiment of the present invention, which corresponds to FIG. 4.

Alternatively, as shown in FIG. 7, the shape of the extension electrode portion 312 may have a rectangular or substantially rectangular shape that is linear with an equal width from a portion narrower than each of both corners of the end of the counter electrode portion 311 adjacent to the first end surface LS1 toward the first end surface LS1. Similarly, the shape of the extension electrode portion 322 may have a rectangular or substantially rectangular shape (not shown) that is linear with an equal width from a portion narrower than each of both corners of the end of the counter electrode portion 321 adjacent to the second end surface LS2 toward the second end surface LS2.

Figure 8:
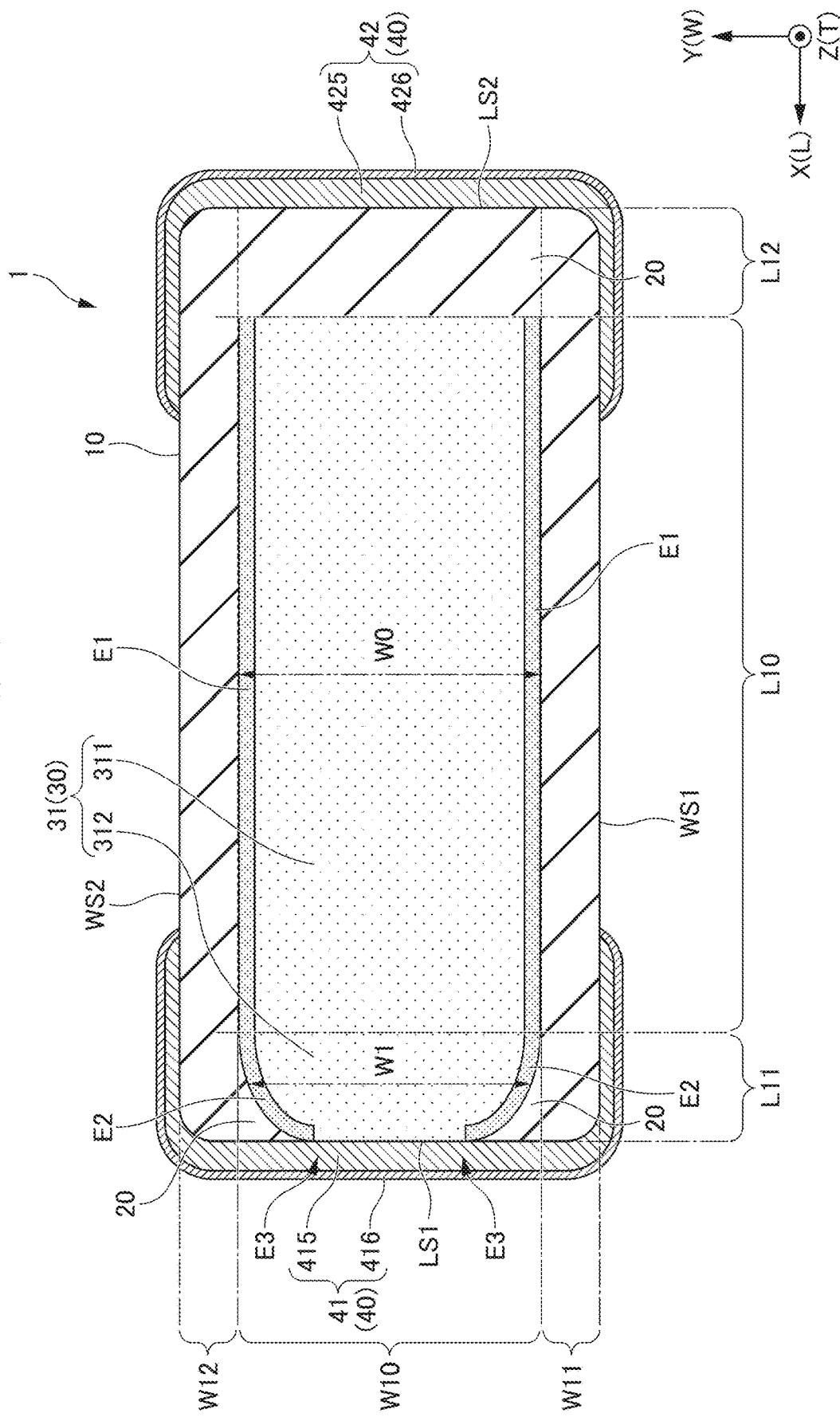
FIG. 8 is a cross-sectional view (LW cross-sectional view) of a multilayer ceramic capacitor according to a third modified example of the present preferred embodiment of the present invention, which corresponds to FIG. 4.

Alternatively, as shown in FIG. 8, the shape of the extension electrode portion 312 may have a curved or substantially curved shape whose width becomes narrower in a curved manner from each of both corners of the end of the counter electrode portion 311 adjacent to the first end surface LS1 toward the first end surface LS1. Similarly, the shape of the extension electrode portion 322 may have a curved or substantially curved shape (not shown) whose width becomes narrower in a curved manner from each of both corners of the end of the counter electrode portion 321 adjacent to the second end surface LS2 toward the second end surface LS2.

As shown in FIG. 4, an end portion E1 of the counter electrode portion 311 in the width direction W of the first internal electrode layer 31 includes Mg as a subcomponent. As shown in FIG. 5, the end portion E1 of the counter electrode portion 321 in the width direction W of the second internal electrode layer 32 includes Mg as a subcomponent.

More specifically, Mg derived from the first side margin portion W11 or the second side margin portion W12 segregates at the end portion E1. The content of Mg in the end portion E1 is about 0.13 mol % or more and about 0.39 mol % or less with respect to 100 mol of Ni, for example.

As shown in FIG. 4, the end portion E2 of the extension electrode portion 312 in the width direction W of the first internal electrode layer 31 may include Mg as a subcomponent. As shown in FIG. 5, the end portion E2 of the extension electrode portion 322 in the width direction W of the second internal electrode layer 32 may include Mg as a subcomponent. More specifically, Mg derived from the first side margin portion W11 or the second side margin portion W12, or Mg derived from the dielectric layer 20 may segregate at the end portion E2. The content of Mg in the end portion E2 is preferably about 0.07 mol % or more and about 0.32 mol % or less with respect to 100 mol of Ni. The content of Mg in the end portion E2 is lower than the content of Mg in the end portion E1.

Furthermore, as shown in FIG. 4, the Mg content of the end portion E2 at an end portion E3, in the width direction W at the first end surface LS1 of the extension electrode portion 312, is preferably about 0.00 mol % or more and about 0.28 mol % or less with respect to 100 mol of Ni, for example. Furthermore, as shown in FIG. 5, the Mg content of the end portion E2 at the end portion E3, in the width direction W at the second end surface LS2 of the extension electrode portion 322, is preferably about 0.00 mol % or more and about 0.28 mol % or less with respect to 100 mol of Ni, for example. The content of Mg at the end portion E3 is lower than the content of Mg at the end portion E2.

The content of Mg in the end portion E2 of the extension electrode portion 312 may gradually decrease from the counter electrode portion 311 toward the first end surface LS1 in the length direction L. Furthermore, the content of Mg in the end portion E2 of the extension electrode portion 322 may gradually decrease from the counter electrode portion 321 toward the second end surface LS2 in the length direction L.

The end portion E1 of the counter electrode portion 311 in the width direction W in the first internal electrode layer 31 may include Si as a subcomponent. Furthermore, the end portion E1 of the counter electrode portion 321 in the width direction W of the second internal electrode layer 32 may include Si as a subcomponent. More specifically, Si derived from the first side margin portion W11 or the second side margin portion W12 may segregate at the end portion E1.

Furthermore, the end portions E2 and E3 of the extension electrode portion 312 in the width direction W in the first internal electrode layer 31 may include Si as a subcomponent. Furthermore, the end portions E2 and E3 of the extension electrode portion 322 in the width direction W in the second internal electrode layer 32 may include Si as a subcomponent. More specifically, Si derived from the first side margin portion W11 or the second side margin portion W12 or Si derived from the dielectric layer 20 may segregate at the end portions E2 and E3.

It should be noted that the end portion E3 of the extension electrode portion 312 may not include Si. In this case, in the end portion E2 of the extension electrode portion 312, Si may be included in a portion from the counter electrode portion 311 toward the first end surface LS1 in the length direction L, for example, a portion up to about ⅔. The end portion E3 of the extension electrode portion 322 may not include Si. In this case, in the end portion E2 of the extension electrode portion 322, Si may be included in a portion from the counter electrode portion 321 toward the second end surface LS2 in the length direction L, for example, a portion up to about ⅔.

Examples of a method of measuring the content of Mg or Si at the end portion E1 of the counter electrode portion 311 of the first internal electrode layer 31 and the end portion E1 of the counter electrode portion 321 of the second internal electrode layer 32 include, for example, a method of observing a WT cross section in the vicinity of the center in the length direction of the multilayer body exposed by polishing. Examples of the measuring instrument include wavelength dispersive X-ray analysis (WDX) or energy dispersive X-ray analysis (EDX), and scanning electron microscope (SEM) or transmission electron microscope (TEM). Each value may be an average value of measurement values at a plurality of locations in the lamination direction. Furthermore, examples of a method of measuring the content of Mg or Si at the end portion E2 of the extension electrode portion 312 of the first internal electrode layer 31 and the end portion E2 of the extension electrode portion 322 of the second internal electrode layer 32 include, for example, a method of observing a WT cross section in the vicinity of the center in the length direction of the extension electrode portion exposed by polishing. Examples of the measuring instrument include a wavelength dispersive X-ray analyzer (WDX) or energy dispersive X-ray analyzer (EDX), and scanning electron microscope (SEM) or transmission electron microscope (TEM). Each value may be an average value of measurement values at a plurality of locations in the lamination direction. Furthermore, examples of a method of measuring the content of Mg or Si at the end portion E3 of the extension electrode portion 312 of the first internal electrode layer 31 and the end portion E3 of the extension electrode portion 322 of the second internal electrode layer 32 include, for example, a method of observing an end surface of a multilayer body exposed by polishing. Examples of the measuring instrument include a wavelength dispersive X-ray analyzer (WDX) or energy dispersive X-ray analyzer (EDX), and scanning electron microscope (SEM) or transmission electron microscope (TEM). Each value may be an average value of measurement values at a plurality of locations in the lamination direction.

Manufacturing Method

Next, a non-limiting example of a method of manufacturing the above-described multilayer ceramic capacitor 1 will be described. First, a dielectric sheet for manufacturing the dielectric layer 20 and an electrically conductive paste for manufacturing the internal electrode layer 30 are prepared. The dielectric sheet includes Mg. The dielectric sheet may include Si and/or a rare earth element Dy. The dielectric sheet and the electrically conductive paste include a binder and a solvent. As the binder and the solvent, well-known materials can be used.

Next, an internal electrode pattern is formed on the dielectric sheet by printing an electrically conductive paste on the dielectric sheet in a predetermined pattern, for example. As a method of forming the internal electrode pattern, screen printing, gravure printing, or the like can be used.

Next, a predetermined number of dielectric sheets for manufacturing the second outer layer portion 102 on which no internal electrode pattern is printed are laminated. A dielectric sheet for manufacturing the inner layer portion 100 on which the internal electrode pattern is printed is sequentially laminated thereon. A predetermined number of dielectric sheets for manufacturing the first outer layer portion 101 on which no internal electrode pattern is printed are laminated thereon. Thus, a multilayer sheet is produced.

Next, the multilayer sheet is pressed in the lamination direction by hydrostatic pressing or other method to prepare a multilayer block. Next, the multilayer block is cut into a predetermined size such that the multilayer chip is cut out. At this time, as is apparent from the cross section of the central portion in the length direction, both end portions of the internal electrode layer in the width direction W are aligned (for example, aligned with an error of about 5 μm).

Next, the dielectric sheets for manufacturing the first side margin portion W11 and the second side margin portion W12 are attached to the lateral surfaces of the multilayer chip. The dielectric sheet includes Mg. The dielectric sheet may include Si and/or a rare earth element Dy. At this time, the corner portions and ridge portions of the multilayer chip are rounded by barrel polishing or the like.

Next, the multilayer chip is fired to prepare a multilayer body 10. The firing temperature is preferably about 900° C. or higher and about 1400° C. or lower, although it depends on the material of the dielectric and the internal electrode. At this time, in the first side margin portion W11 and the second side margin portion W12, grain growth of ceramic grains can be suppressed by the action of Mg. Furthermore, in the first side margin portion W11 and the second side margin portion W12, the sintering properties of the ceramic can be enhanced by the action of Si. Furthermore, in the first side margin portion W11 and the second side margin portion W12, high-temperature reliability can be improved by the action of the rare earth element Dy. At this time, Mg or Si derived from the first side margin portion W11 or the second side margin portion W12 segregates in the end portion E1 of the counter electrode portion 311 of the first internal electrode layer 31 and the end portion E1 of the counter electrode portion 321 of the second internal electrode layer 32. Furthermore, Mg or Si derived from the first side margin portion W11 or the second side margin portion W12, and Mg or Si derived from the dielectric layer 20 segregate at the end portions E2 and E3 of the extension electrode portion 312 of the first internal electrode layer 31 and at the end portions E2 and E3 of the extension electrode portion 312 of the second internal electrode layer 32.

Next, by immersing the first end surface LS1 of the multilayer body 10 in an electrically conductive paste, which is an electrode material for manufacturing the base electrode layer, the electrically conductive paste for manufacturing the first base electrode layer 415 is applied to the first end surface LS1. Similarly, by immersing the second end surface LS2 of the multilayer body 10 in an electrically conductive paste, which is an electrode material for the base electrode layer, the electrically conductive paste for manufacturing the second base electrode layer 425 is applied to the second end surface LS2. Thereafter, these electrically conductive pastes are fired, such that the first base electrode layer 415 and the second base electrode layer 425, which are fired layers, are formed. The firing temperature is preferably about 600° C. or higher and about 900° C. or lower.

It is to be noted that, as described above, the first base electrode layer 415 and the second base electrode layer 425, which are resin layers, may be formed by applying an electrically conductive paste including electrically conductive particles and a thermosetting resin by a coating method and firing, or the first base electrode layer 415 and the second base electrode layer 425, which are thin films, may be formed by a thin film formation method such as a sputtering method or a vapor deposition method.

Furthermore, in the above description, the multilayer chip is fired following which the base electrode layer is formed and fired. In other words, the multilayer body and the external electrodes are fired separately. However, the base electrode layer may be formed and fired before firing the multilayer chip. In other words, the multilayer body and the external electrodes may be fired simultaneously.

Thereafter, the first plated layer 416 is formed on the surface of the first base electrode layer 415 to form the first external electrode 41, and the second plated layer 426 is formed on the surface of the second base electrode layer 425 to form the second external electrode 42. Through the above steps, the above-described multilayer ceramic capacitor 1 is obtained.

As described above, according to the multilayer ceramic capacitor 1 of the present preferred embodiment, as shown in FIG. 4, since the width W1 of the extension electrode portion 312 is smaller than the width W0 of the counter electrode portion 311 in the first internal electrode layer 31, the distance from the first lateral surface WS1 of the multilayer body 10 to the first internal electrode layer 31 is long at the first end surface LS1 of the multilayer body 10. With such a configuration, it is possible to lengthen the moisture intrusion path from the space between the first external electrode 41, and the first lateral surface WS1 and the second lateral surface WS2 of the multilayer body 10 to the first internal electrode layer 31 of the first end surface LS1 of the multilayer body 10. Furthermore, as shown in FIG. 5, in the second internal electrode layer 32, since the width W1 of the extension electrode portion 322 is smaller than the width W0 of the counter electrode portion 321, the distance from the first lateral surface WS1 and the second WS2 of the multilayer body 10 to the second internal electrode layer 32 is longer at the second end surface LS2 of the multilayer body 10. With such a configuration, it is possible to lengthen the moisture intrusion path from the space between the second external electrode 42, and the first lateral surface WS1 and the second lateral surface WS2 of the multilayer body 10 to the second internal electrode layer 32 of the second end surface LS2 of the multilayer body 10. Therefore, it is possible to improve the moisture resistance of the multilayer ceramic capacitor 1, and thus, it is possible to improve the reliability of the multilayer ceramic capacitor 1.

Furthermore, according to the multilayer ceramic capacitor 1 of the present preferred embodiment, the first side margin portion W11 and the second side margin portion W12 include Mg as a subcomponent, and the Mg content is about 0.2 mol % or more and about 2.0 mol % or less with respect to 100 mol of Ti, for example. With such a configuration, it is possible to reduce or prevent the grain growth of the ceramic grains in the first side margin portion W11, and it is possible to reduce or prevent the penetration of moisture from the first lateral surface WS1 of the multilayer body 10 into the first side margin portion W11 to the internal electrode layer 30. Furthermore, it is possible to reduce or prevent the grain growth of the ceramic grains in the second side margin portion W12, and it is possible to reduce or prevent the penetration of moisture from the second lateral surface WS2 of the multilayer body 10 into the second side margin portion W12 to the internal electrode layer 30. Therefore, it is possible to improve the moisture resistance of the multilayer ceramic capacitor 1, and it is possible to improve the reliability of the multilayer ceramic capacitor 1.

According to the multilayer ceramic capacitor 1 of the present preferred embodiment, the first side margin portion W11 and the second side margin portion W12 may include Si as a subcomponent, and the content of Si is preferably about 1.0 mol % or more and about 2.8 mol % or less with respect to 100 mol of Ti, for example. With such a configuration, it is possible to enhance the sintering properties of the ceramics of the first side margin portion W11 and the second side margin portion W12, and it is possible to improve the reliability (life) of the multilayer ceramic capacitor 1. In particular, it is possible to improve the high-temperature reliability of the multilayer ceramic capacitor 1.

Furthermore, according to the multilayer ceramic capacitor 1 of the present preferred embodiment, Mg derived from the first side margin portion W11 or the second side margin portion W12 segregates at the end portion E1 of the counter electrode portion 311 of the first internal electrode layer 31 and at the end portion E1 of the counter electrode portion 321 of the second internal electrode layer 32, and the content of Mg is about 0.13 mol % or more and about 0.39 mol % or less with respect to 100 mol of Ni. With such a configuration, it is possible to reduce or prevent electric field concentration at the end portion E1 of the counter electrode portion 311 of the first internal electrode layer 31 and at the end portion E1 of the counter electrode portion 321 of the second internal electrode layer 32, and it is possible to improve the reliability (life) of the multilayer ceramic capacitor 1. In particular, it is possible to improve the high-temperature reliability of the multilayer ceramic capacitor 1.

According to the multilayer ceramic capacitor 1 of the present preferred embodiment, Mg derived from the first side margin portion W11 or the second side margin portion W12, or Mg derived from the dielectric layer 20 may segregate at the end portion E2 of the extension electrode portion 312 of the first internal electrode layer 31 and at the end portion E2 of the extension electrode portion 322 of the second internal electrode layer 32, and the content of Mg is preferably about 0.07 mol % or more and about 0.32 mol % or less with respect to 100 mol of Ni, for example. Furthermore, among the end portions E2, the content of Mg in the end portion E3 at the first end surface LS1 of the extension electrode portion 312 and the content of Mg in the end portion E3 at the second end surface LS2 of the extension electrode portion 322 are preferably about 0.00 mol % or more and about 0.28 mol % or less with respect to 100 mol of Ni, for example. With such a configuration, it is possible to reduce or prevent electric field concentration at the end portions E2 and E3 of the extension electrode portion 312 of the first internal electrode layer 31 and at the end portions E2 and E3 of the extension electrode portion 322 of the second internal electrode layer 32, and it is possible to improve the reliability (life) of the multilayer ceramic capacitor 1. In particular, it is possible to improve the high-temperature reliability of the multilayer ceramic capacitor 1.

Furthermore, according to the multilayer ceramic capacitor 1 of the present preferred embodiment, Si derived from the first side margin portion W11 or the second side margin portion W12 may segregate in the end portion E1 of the counter electrode portion 311 of the first internal electrode layer 31 and in the end portion E1 of the counter electrode portion 321 of the second internal electrode layer 32. Furthermore, Si derived from the first side margin portion W11 or the second side margin portion W12, or Si derived from the dielectric layer 20 may segregate in the end portions E2 and E3 of the extension electrode portion 312 of the first internal electrode layer 31 and in the end portions E2 and E3 of the extension electrode portion 322 of the second internal electrode layer 32. With such a configuration, it is possible to reduce or prevent electric field concentration in the end portion E1 of the counter electrode portion 311 of the first internal electrode layer 31, the end portion E1 of the counter electrode portion 321 of the second internal electrode layer 32, the end portions E2 and E3 of the extension electrode portion 312 of the first internal electrode layer 31, and the end portions E2 and E3 of the extension electrode portion 322 of the second internal electrode layer 32, such that it is possible to improve the reliability (life) of the multilayer ceramic capacitor 1. In particular, it is possible to improve the high-temperature reliability of the multilayer ceramic capacitor 1.

Furthermore, according to the multilayer ceramic capacitor 1 of the present preferred embodiment, the first side margin portion W11 and the second side margin portion W12 may include the rare earth element Dy as a subcomponent, and the content of the rare earth element Dy is preferably about 0.8 mol % or more and about 2.0 mol % or less with respect to 100 mol of Ti, for example. When the content of the rare earth element Dy is less than about 0.8 mol %, the efficiency of suppressing the migration of oxygen vacancies is low, so that the reliability (life) of the multilayer ceramic capacitor 1 decreases. When the content of the rare earth element Dy exceeds about 2.0 mol %, the moisture resistance of the the multilayer ceramic capacitor 1 decreases due to insufficient denseness of the ceramics.

Although preferred embodiments of the present invention have been described above, the present invention is not limited to the preferred embodiments described above, and various changes and modifications are possible.

EXAMPLES

Hereinafter, preferred embodiments of the present invention will be described based on Examples. However, the present invention is not limited to the following Examples.

Non-limiting samples of the multilayer ceramic capacitors of the present preferred embodiments shown in FIGS. 1 to 5 were manufactured as Examples 1 to 8, and the multilayer ceramic capacitors of Comparative Examples 1 and 2 were also manufactured. The main configurations of the multilayer ceramic capacitors of Examples 1 to 8 and Comparative Examples 1 and 2 were as follows.

Multilayer ceramic capacitor: 0603 size (L=0.6 mm, W=0.3 mm, T=0.3 mm)

Dielectric layer 20: Main components Ba and Ti, subcomponents Mg and Si, rare earth elements Dy, thickness 0.40 µm, the number of the dielectric layers: 100

Main component Ni of the internal electrode layer 30, the thickness of 0.30 µm, and the number of the internal electrode layers 30: 10

Extension electrode portions 312 and 322: Length 25 µm in the length direction L Side margin portions W11 and W12: Main components Ba and Ti, subcomponents Mg and Si, a rare earth element Dy, and a thickness of 18 µm Furthermore, the mole % of the content of the subcomponents Mg and Si with respect to 100 moles of Ti in the side margin portions W11 and W12 of the multilayer ceramic capacitors of Examples 1 to 8 and Comparative Examples 1 and 2, and the mole % of the content of Mg with respect to 100 moles of Ni in the end portions E1, E2, and E3 in the width direction W of the internal electrode layer 30 are as shown in Table 1.

A method of measuring each content is described above as an example. That is, in the measurement of the content of Mg and Si in the side margin portions W11 and W12, a WT cross section in the vicinity of the center in the length direction of the multilayer body exposed by polishing was observed. A wavelength dispersive X-ray analyzer (WDX) or energy dispersive X-ray analyzer (EDX) and scanning electron microscope (SEM) or transmission electron microscope (TEM) were used as measuring instruments. Each value was an average value of measurement values at five locations in the lamination direction. In the measurement of the Mg content at the end portion E1 of the counter electrode portion of the internal electrode layer 30, a WT cross section in the vicinity of the center in the length direction of the multilayer body exposed by polishing was observed. Furthermore, in the measurement of the Mg content at the end Table 1 shows the number of failures in 100 samples as evaluation results of HALT of moisture resistance reliability and high temperature reliability (life). As a failure determination value, the inter-terminal insulation resistance was set to 100 kΩ or less. Table 1 also shows three-stage determinations as comprehensive determinations of HALT. In the three-stage determinations, a case where the number of failures was 0 was defined as "excellent", a case where the number of failures was less than 3 was defined as "good", and a case where the number of failures was more than 3 was defined as "fail".

TABLE 1

|  | Side Margin Portion | | Internal Electrode Layer | | | Moisture Resistance Reliability 85° C. | High-temperature Reliability 85° C. | |
|---|---|---|---|---|---|---|---|---|
|  |  |  | Mg Segregation Amount at End | Mg Segregation Amount at End | Mg Segregation Amount at End |  |  |  |
|  | Mg Content (mol %) | Si Content (mol %) | portion E1 (mol %) | portion E2 (mol %) | portion E3 (mol %) | 85% RH 6.3V | 6.3 V 1000 hr | Comprehensive Determination |
| Comparative Example 1 | 0.0 | 0.7 | 0.00 | 0.00 | 0.00 | 3/100 | 3/100 | fail |
| Example 1 | 0.2 | 0.9 | 0.13 | 0.07 | 0.00 | 0/100 | 2/100 | good |
| Example 2 | 0.5 | 1.0 | 0.20 | 0.15 | 0.07 | 0/100 | 0/100 | excellent |
| Example 3 | 1.0 | 1.5 | 0.26 | 0.20 | 0.13 | 0/100 | 0/100 | excellent |
| Example 4 | 1.5 | 1.6 | 0.32 | 0.28 | 0.20 | 0/100 | 0/100 | excellent |
| Example 5 | 1.8 | 2.0 | 0.36 | 0.29 | 0.23 | 0/100 | 0/100 | excellent |
| Example 6 | 2.0 | 2.5 | 0.40 | 0.33 | 0.28 | 0/100 | 0/100 | excellent |
| Example 7 | 2.0 | 2.8 | 0.41 | 0.31 | 0.29 | 0/100 | 0/100 | excellent |
| Example 8 | 2.0 | 3.0 | 0.39 | 0.32 | 0.28 | 0/100 | 1/100 | good |
| Comparative Example 2 | 2.1 | 0.5 | 0.43 | 0.35 | 0.30 | 5/100 | 3/100 | fail | portion E2 of the extension electrode portion of the internal electrode layer 30, the WT cross section in the vicinity of the center in the length direction of the extension electrode portion exposed by polishing was observed. Furthermore, as a method of measuring the Mg content at the end portion E3 of the extension electrode portion of the internal electrode layer 30, the end surface of the multilayer body exposed by polishing was observed. As these measuring instruments, a wavelength dispersive X-ray analyzer (WDX) or energy dispersive X-ray analyzer (EDX) and scanning electron microscope (SEM) or transmission electron microscope (TEM) were used. Each value was an average value of measurement values at five positions in the lamination direction.

Evaluation

As a reliability test of the multilayer ceramic capacitors of Examples and Comparative Examples, HALT (Highly Accelerated Limit Test) was performed. The HALT refers to a test in which stress such as temperature and vibration exceeding specification is applied to a test target to reveal an operating limit and/or a breakdown limit, in other words, an operating margin and/or a breakdown margin for specification, i.e., a so-called acceleration test and/or a breakdown test. HALT allows a margin to a specification, i.e., reliability, to be tested in a short period of time. The HALT conditions were provided in the following two ways.

Moisture resistance reliability: temperature 85° C., humidity 85% RH, voltage 6.3 V
High temperature reliability (life): temperature 85° C., voltage 6.3 V, 1000 hours According to Table 1, it is appreciated that, when the Mg content of the side margin portions W11 and W12 was about 0.2 mol % or more and about 2.0 mol % with respect to 100 mol of Ti, for example, moisture resistance reliability was high. Furthermore, it is appreciated that, when the Si content of the side margin portions W11 and W12 was about 1.0 mol % or more and about 2.8 mol % or less with respect to 100 mol of Ti, for example, the high-temperature reliability was high.

Furthermore, it is appreciated that, when the Mg content of the end portion E1 of the counter electrode portion of the internal electrode layer 30 was about 0.13 mol % or more and about 0.39 mol % or less with respect to 100 mol of Ni, when the Mg content of the end portion E2 of the extension electrode portion of the internal electrode layer 30 was about 0.07 mol % or more and about 0.32 mol % or less with respect to 100 mol of Ni, or when the Mg content of the end portion E3 of the extension electrode portion of the internal electrode layer 30 was about 0.00 mol % or more and about 0.28 mol % or less with respect to 100 mol of Ni, for example, the high-temperature reliability was high.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers made of a ceramic material and a plurality of internal electrode layers laminated therein, two main surfaces opposed to each other in a lamination direction, two lateral surfaces opposed to each other in a width direction intersecting the lamination direction, and two end surfaces opposed to each other in a length direction intersecting the lamination direction and the width direction; and
two external electrodes provided on each of the two end surfaces of the multilayer body; wherein
the multilayer body includes two side margin portions provided to sandwich the plurality of dielectric layers and the plurality of internal electrode layers in the width direction, the two side margin portions each including a dielectric made of a ceramic material;
each of the plurality of internal electrode layers includes, in the length direction, a counter electrode portion opposed to each other between adjacent internal electrode layers in the lamination direction, and an extension electrode portion extending from the counter electrode portion toward one of the two end surfaces;
end portions in the width direction of the counter electrode portions of the plurality of internal electrode layers are aligned to be positioned in a range of about 5 μm in the width direction;
a width in the width direction of the extension electrode portion is smaller than a width in the width direction of the counter electrode portion;
each of the two side margin portions includes Ba and Ti as main components, and Mg as a sub component;
Mg content in each of the two side margin portions is about 0.2 mol % or more and about 2.0 mol % or less with respect to 100 mol of Ti;
each of the plurality of internal electrode layers includes Ni as a main component;
an end portion in the width direction of the counter electrode portion of each of the plurality of internal electrode layers includes Mg as a sub component; and
Mg content at the end portion in the width direction of the counter electrode portion of each of the plurality of internal electrode layers is about 0.13 mol % or more and about 0.39 mol % or less with respect to 100 mol of Ni.

2. The multilayer ceramic capacitor according to claim 1, wherein
each of the two side margin portions includes Si as a sub component; and
Si content in each of the two side margin portions is about 1.0 mol % or more and about 2.8 mol % or less with respect to 100 mol of Ti.

3. The multilayer ceramic capacitor according to claim 2, wherein
the end portion in the width direction of the counter electrode portion of each of the plurality of internal electrode layers includes Si as a sub component; and
the end portion in the width direction of the extension electrode portion of each of the plurality of internal electrode layers includes Si as a sub component.

4. The multilayer ceramic capacitor according to claim 1, wherein
an end portion in the width direction of the extension electrode portion of each of the plurality of internal electrode layers includes Mg as a sub component; and
Mg content at the end portion in the width direction of the extension electrode portion of each of the plurality of internal electrode layers is about 0.07 mol % or more and about 0.32 mol % or less with respect to 100 mol of Ni.

5. The multilayer ceramic capacitor according to claim 1, wherein
an end portion in the width direction at the end surface of the extension electrode portion of each of the plurality of internal electrode layers includes Mg as a sub component; and
Mg content at the end portion in the width direction at the end surface of the extension electrode portion of each of the plurality of internal electrode layers is about 0.00 mol % or more and about 0.28 mol % or less with respect to 100 mol of Ni.

6. The multilayer ceramic capacitor according to claim 1, wherein
an end portion in the width direction of the extension electrode portion of each of the plurality of internal electrode layers includes Mg as a sub component; and
the Mg content at the end portion in the width direction of the extension electrode portion of each of the plurality of internal electrode layers decreases from the counter electrode portion toward the end surface in the length direction.

7. The multilayer ceramic capacitor according to claim 1, wherein
each of the two side margin portions includes a rare earth element as a sub component; and
a rare earth element content in each of the two side margin portions is about 0.8 mol % or more and about 2.0 mol % or less with respect to 100 mol of Ti.

8. The multilayer ceramic capacitor according to claim 1, wherein a length in the length direction of the extension electrode portion of each of the plurality of internal electrode layers is about 20 μm or more and about 50 μm or less.

9. The multilayer ceramic capacitor according to claim 1, wherein the multilayer body has a rectangular or substantially rectangular shape.

10. The multilayer ceramic capacitor according to claim 1, wherein the multilayer body includes rounded corner portions and rounded ridge portions.

11. The multilayer ceramic capacitor according to claim 1, wherein each of the plurality of dielectric layers includes $BaTiO_3$, $CaTiO_3$, $SrTiO_3$, or $CaZrO_3$, as a main component.

12. The multilayer ceramic capacitor according to claim 11, wherein each of the plurality of dielectric layers includes Mg, Si, Mn, rare earth elements, Al, Ni, or V as a subcomponent.

13. The multilayer ceramic capacitor according to claim 1, wherein each of the two side margin portions has a thickness of about 13 μm or more and about 25 μm or less.

14. The multilayer ceramic capacitor according to claim 1, wherein each of the two side margin portions has a thickness of about 13 μm or more and about 18 μm or less.

15. The multilayer ceramic capacitor according to claim 1, wherein the multilayer body has a length of about 0.6 mm or more and about 1.6 mm or less, a width of about 0.3 mm or more and about 0.8 mm or less, and a thickness of about 0.3 mm or more and about 0.8 mm or less.

16. The multilayer ceramic capacitor according to claim 1, wherein the multilayer ceramic capacitor has a length of about 0.6 mm or more and about 1.6 mm or less, a width of about 0.3 mm or more and about 0.8 mm or less, and a thickness of about 0.3 mm or more and about 0.8 mm or less.

17. The multilayer ceramic capacitor according to claim 1, wherein
- each of the two side margin portions includes Si as a sub component; and
- Si content in each of the two side margin portions is about 0.2 mol % or more and about 2.0 mol % or less with respect to 100 mol of Ti.

18. The multilayer ceramic capacitor according to claim 1, wherein
- each of the two side margin portions includes Dy as a sub component; and
- Dy content in each of the two side margin portions is about 0.8 mol % or more and about 2.0 mol % or less with respect to 100 mol of Ti.

19. The multilayer ceramic capacitor according to claim 1, wherein the extension electrode portion has a shape that is trapezoidal, substantially trapezoidal, rectangular, substantially rectangular, curved, or substantially curved.

20. The multilayer ceramic capacitor according to claim 1, wherein an end portion in the width direction of the extension electrode portion of each of the plurality of internal electrode layers includes Si as a sub component.

* * * * *